Oct. 7, 1924.
F. SAUVAGÉ
1,511,140
TREATMENT OF ARTIFICIAL GEMS
Filed Dec. 31, 1920
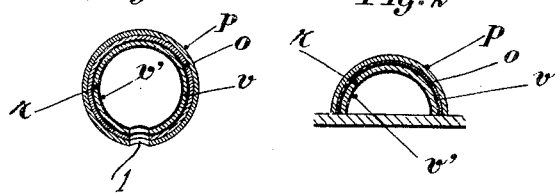
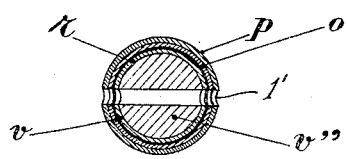
Inventor
F. Sauvagé
by Lawrence Langner
Atty.

Patented Oct. 7, 1924.

1,511,140

UNITED STATES PATENT OFFICE.

FERNAND SAUVAGÉ, OF PARIS, FRANCE.

TREATMENT OF ARTIFICIAL GEMS.

Application filed December 31, 1920. Serial No. 434,401.

(GRANTED UNDER THE PROVISIONS OF THE ACT OF MARCH 3, 1921, 41 STAT. L., 1313.)

*To all whom it may concern:*

Be it known that I, FERNAND SAUVAGÉ, a citizen of the French Republic, and residing at 23 Boulevard des Italiens, Paris, France, have invented certain new and useful Improvements in the Treatment of Artificial Gems (for which I have filed an application in France, dated Jan. 8th, 1919, and patented Dec. 27, 1921, Number 530,627), of which the following is a specification.

The present invention relates to the application to artificial pearls, half-pearls, paste diamonds, colored stones and so forth, of a coating of a suitable phosphorescent substance, which is applied on the inner surface of the pearl or the like so as to produce a particular effect in the twilight and to become luminous in the dark.

When the invention is applied to an artificial pearl, for example, the gem has its usual appearance by day-light, the orient or lustre thereof is not modified and there is nothing to indicate that the pearl has been treated in a particular manner. When such a pearl is moved in the twilight, quite a remarkable change of color is produced; if for example radio-active sulphide of zinc is used as the phosphorescent substance, an emerald green color appears when the light is diminished. In total darkness, the stone becomes quite luminous with a color that depends upon the nature of the phosphorescent product used.

The invention is carried into effect in the following manner: reference being had to the accompanying drawings wherein, Figs. 1, 2 and 3 are cross sectional views of three forms of artificial pearls.

When the invention is applied to artificial pearls Figures 1 and 3 or half-pearls (Fig. 2), these should preferably be either thin-walled as at P or transparent or obtained from an orient such as ablet or bleak scales, essence of orient, crystal powder and so forth or tinted glass which may be either in white, grey or any other color.

These pearls may be of any desired external shape; and are preferably provided with an opening as 1 and 1' for the introduction of the orient or lustre producing substance O and the phosphorescent substance $r$. If the substances which produce the orient are liable to be attacked by the phosphorescent substance employed, the orient of the pearl may be protected by any usual transparent varnish $v$, applied to the interior thereof. The phosphorescent substance may be in the form of a fluid paste, giving a suitable natural color by day-light, and may be introduced into the pearl by blowing, dusting or in any other suitable manner. The phosphorescent substance also improves the appearance of the transparent or translucent surfaces of the pearl without injuring the orient. This phosphorescent substance should also be protected against the action of the air by a coat of transparent varnish $v'$ (Figs. 1 and 2). The varnish and phosphorescent material may be dried in a suitable furnace.

In the case of pearls whose orient or lustre is produced by "crystal powder," the phosphorescent substance is incorporated indirectly in this powder.

Pearls thus treated may be provided with a single opening or they may be pierced right through when required to form a necklace. The phosphorescent substance then constitutes the core of the pearl, which becomes very resistant, and can be used for any purpose for which real pearls are used. This core can be completed with wax or other inert material $v''$ (Fig. 3) which protects the phosphorescent material against all external influences.

When the invention is applied to artificial diamonds, the process of silvering, which is used to increase the brilliancy of these stones, may be omitted. The application of a layer of radio-active material protected by a layer of varnish, on the bottom face of the stone, gives in day-light a brilliancy almost equal to that of the silvering, but produces in twilight and darkness results similar to those described with reference to pearls. The colorations obtained in twilight and while passing from light to more or less intense shadow, also vary according to the composition of the radio-active material. In darkness, these stones show an appreciable luminosity.

The invention can be applied in the same manner to colored stones, such as imitation rubies, emeralds, opals and so forth; these stones retain their usual properties by day-light and give remarkable coloring or luminous effects in twilight or in darkness, combining their own coloration with that of the radio-active material employed.

Pearls or stones treated in the above manner may either be set or mounted as jewels, or they may be used for the most varied forms of decoration.

By reason of the luminosity obtained they may be used not only for jewelry, but also for the production of signs, arrows, letters, designs and so forth, composed of luminous pearls or stones of all colors, placed side by side and arranged in any suitable combination.

As applied to jewelry, the luminosity of the pearls and stones has the effect of projecting the light on to the setting, which thus presents an effective brilliancy.

Having thus described my invention what I claim as new and desire to secure by Letters Patent is:—

1. An artificial pearl, comprising, an outer shell, in combination with interior layers of, a lustre producing material, a transparent varnish, a luminous material, and a transparent varnish, said layers covering the inside of the shell.

2. An artificial pearl, comprising, an outer shell, in combination with successive interior layers of, a lustre producing material, a transparent varnish, a luminous material, and a transparent varnish, said layers completely covering the inside of the shell.

FERNAND SAUVAGÉ.